(12) United States Patent
Chen et al.

(10) Patent No.: US 6,269,841 B1
(45) Date of Patent: Aug. 7, 2001

(54) ENERGY ATTENUATION APPARATUS FOR A SYSTEM CONVEYING LIQUID UNDER PRESSURE AND METHOD OF ATTENUATING ENERGY IN SUCH A SYSTEM

(75) Inventors: Yungrwei Chen, West Bloomfield, MI (US); Jack R. Cooper, Hobe Sound, FL (US)

(73) Assignee: Dayco Products LLC, Dayton, OH (US)

( * ) Notice: Subject to any disclaimer, the term of this patent is extended or adjusted under 35 U.S.C. 154(b) by 0 days.

(21) Appl. No.: 09/668,229

(22) Filed: Sep. 22, 2000

Related U.S. Application Data

(63) Continuation-in-part of application No. 09/030,031, filed on Feb. 25, 1998, now Pat. No. 6,123,108, which is a continuation-in-part of application No. 08/846,912, filed on Apr. 30, 1997, now Pat. No. 6,085,792.

(51) Int. Cl.$^7$ ..................................................... F16L 55/04
(52) U.S. Cl. .................................. 138/30; 138/40; 138/44; 181/256
(58) Field of Search ................................ 138/30, 26, 40, 138/42, 44; 181/222, 232, 238, 256, 257, 275, 281

(56) References Cited

U.S. PATENT DOCUMENTS

| | | |
|---|---|---|
| 3,323,305 | 6/1967 | Klees . |
| 4,371,053 | 2/1983 | Jones . |
| 4,501,341 | 2/1985 | Jones . |
| 4,611,633 * | 9/1986 | Buchholz et al. ..................... 138/26 |
| 4,671,380 | 6/1987 | Henderson et al. . |
| 5,168,855 | 12/1992 | Stone . |
| 5,172,729 * | 12/1992 | Vantellini ................................ 138/26 |
| 5,201,343 * | 4/1993 | Zimmermann et al. ............... 138/26 |
| 5,495,711 * | 3/1996 | Kalkman et al. ...................... 138/26 |
| 5,509,391 | 4/1996 | DeGroot . |
| 5,539,164 | 7/1996 | Van Ruiten . |
| 5,728,981 * | 3/1998 | Van Ruiten ........................... 138/30 |
| 5,941,283 * | 8/1999 | Forte ..................................... 138/26 |
| 6,073,656 * | 6/2000 | Chen et al. ........................... 138/44 |
| 6,123,108 * | 9/2000 | Chen et al. ........................... 138/30 |
| 6,125,890 * | 10/2000 | Cooper et al. ........................ 138/30 |

OTHER PUBLICATIONS

"Acoustics of Ducts and Mufflers" by M.L. Munjal, pp. 71–72 Copyright 1987 by John Wiley & Sons, Inc.

* cited by examiner

Primary Examiner—James Hook
(74) Attorney, Agent, or Firm—Joseph V. Tassone

(57) ABSTRACT

An energy attenuation apparatus for a system conveying liquid under pressure is provided, wherein the apparatus is disposed in a liquid conveying line of said system. A restrictor or tubing section is disposed in a hose and divides the interior thereof into an inlet chamber and an outlet chamber that communicate with one another. A first tuning cable of polymeric material is disposed in the inlet chamber, with a first end of the tuning cable being connected to the inlet end of the inlet chamber for receiving liquid from the system, while a second open end of the tuning cable is spaced from the outlet end of the inlet chamber for conveying liquid thereto. A second tuning cable of polymeric material is disposed in the outlet chamber, with a first end of the tuning cable being connected to the restrictor or tubing for receiving the liquid, while a second open end of the tuning cable is spaced from the outlet end of the outlet chamber for conveying the liquid thereto.

16 Claims, 12 Drawing Sheets

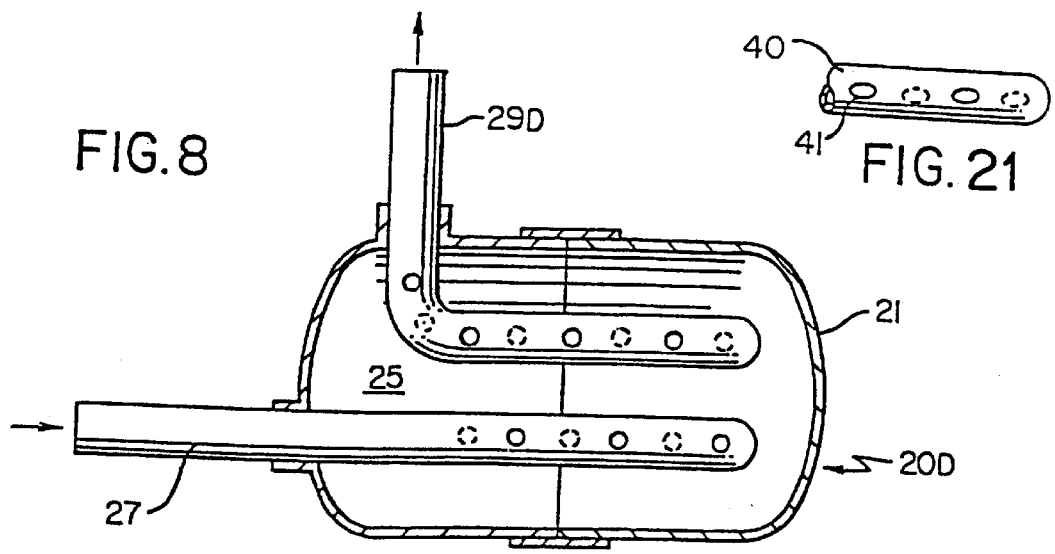
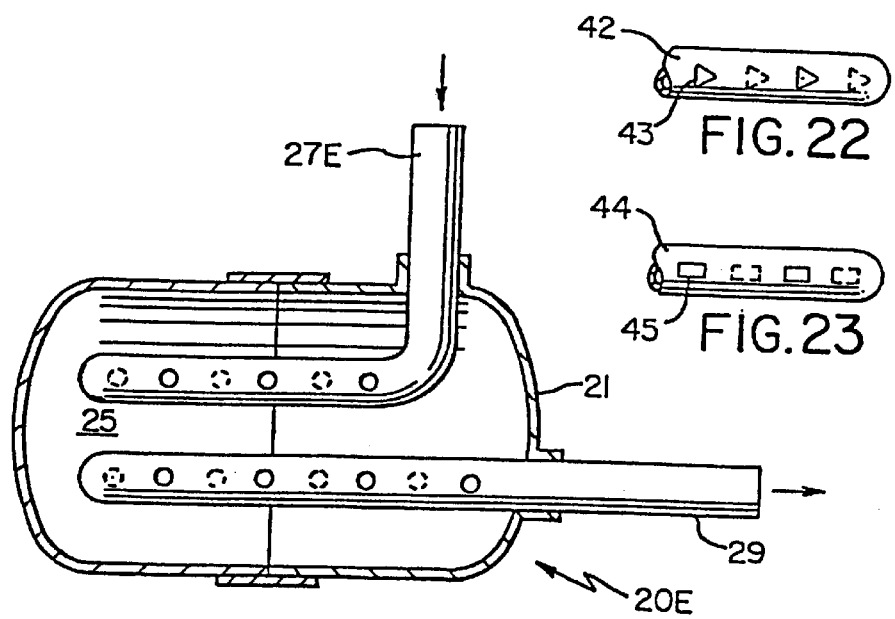
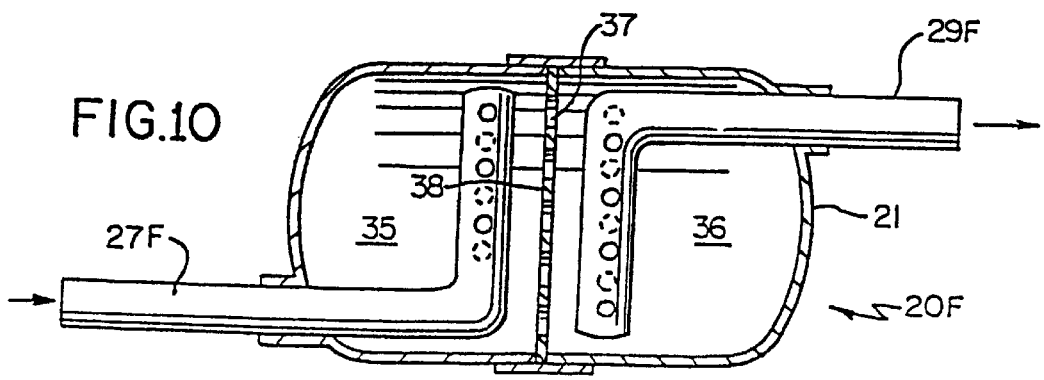

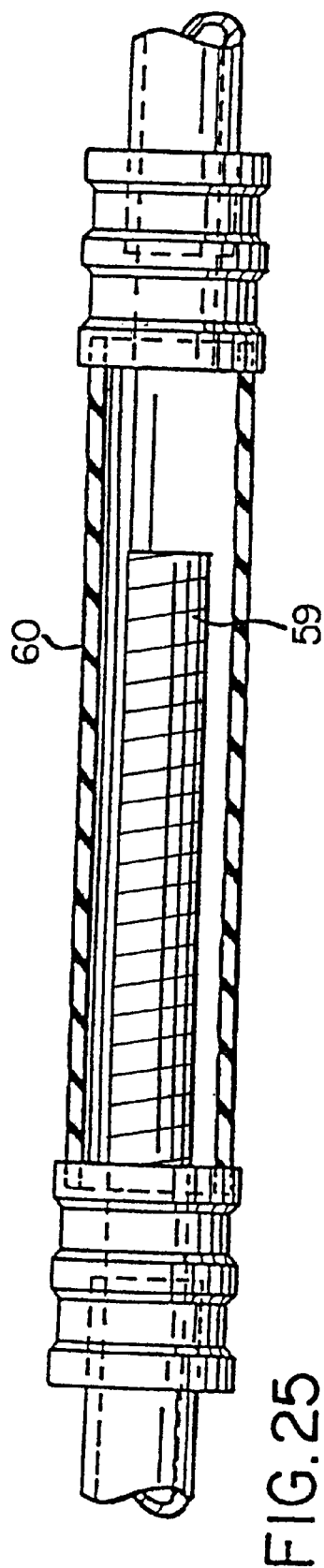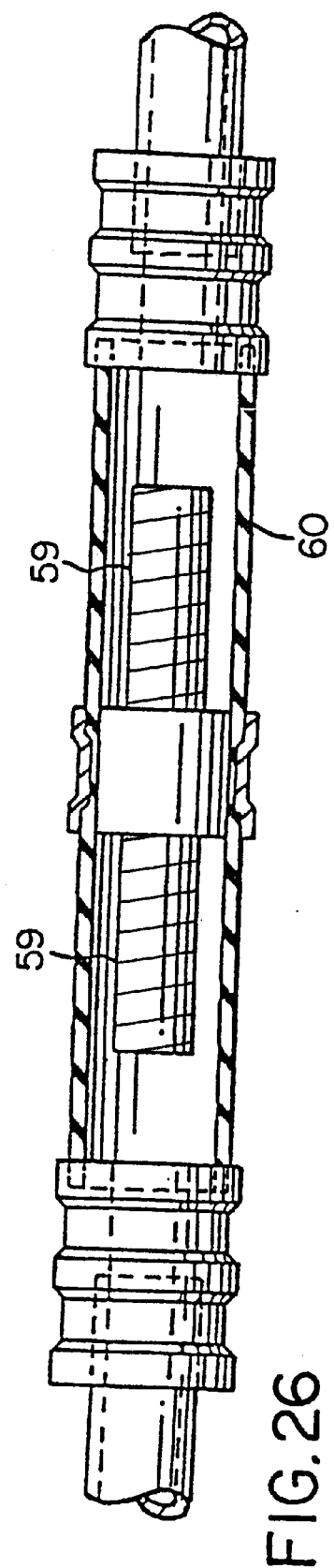

ENERGY ATTENUATION APPARATUS FOR A SYSTEM CONVEYING LIQUID UNDER PRESSURE AND METHOD OF ATTENUATING ENERGY IN SUCH A SYSTEM

CROSS-REFERENCE TO RELATED APPLICATION

This is a Continuation-In-Part application of applicants' application Ser. No. 09/030,031, filed on Feb. 25, 1998 now U.S. Pat. No. 6,123,108, which is a Continuation-In-Part of Ser. No. 08/846,912 filed Apr. 30, 1997, now U.S. Pat. No. 6,085,792.

BACKGROUND OF THE INVENTION

1. Field of the Invention

This invention relates to a new energy attenuation apparatus for a system conveying a liquid under pressure and to a method of attenuating energy in such a system. The invention is particularly suitable for placement in a system conveying liquid under pressure for the attenuation of pressure pulsations in the liquid, especially in the hydraulic system of the power steering unit of a vehicle. The invention would also be suitable for other hydraulic fluids.

2. Prior Art Statement

In hydraulic systems where the operating liquid is circulated by a pump, the pulsations of pressure that are generated by the pump are transmitted through the conduits and result in noise and/or vibration being produced by the hydraulic liquid. In the case of power steering fluid in vehicles, such noise and/or vibration is caused, for example, when vehicles are being parked or unparked at idle or very low speeds of movement thereof, such as by barely moving into and out of a parking space or the like while the wheels of the vehicle are being turned by the power steering mechanism thereof. In particular, substantial noise and/or vibration (shudder) can be produced in such a situation when the power steering fluid passes through the power steering mechanism from the fluid pump to the effective steering structure. Further background in this area can be obtained from U.S. Pat. No. 3,323,305, Klees, whereby this U.S. Patent is being incorporated into this disclosure by this reference thereto.

Devices are known for suppressing noise in exhaust gas mufflers. For example, U.S. Pat. No. 4,501,341, Jones, provides two side branch resonators, while U.S. Pat. No. 4,371,053, Jones, provides for an apertured tube in a gas muffler housing. Systems are also known for controlling the resonation of pressure waves in fuel injection systems. For example, U.S. Pat. No. 5,168,855, Stone, passes fluid through check valves that are provided with a flow restriction either directly therein or in a bypass line. U.S. Pat. No. 5,509,391, DeGroot, provides a spool valve assembly for controlling flow between inlet and outlet ports. Henderson et al, U.S. Pat. No. 4,671,380, discloses a long and narrow tubular casing having a perforated tube extending therethrough. "Acoustics of Ducts and Mufflers", by M. L. Munjal, provides a resonator for conveying gas in the form of an apertured tube disposed in a tubular cavity. Finally, U.S. Pat. No. 5,539,164, van Ruiten, discloses a power steering attenuation hose construction that utilizes wound or coiled metal tuning cables.

SUMMARY OF THE INVENTION

It is therefore an object of the present invention to provide an improved apparatus and method for attenuating energy in a system that conveys liquid under pressure.

This object is realized pursuant to the energy attenuation apparatus of the present invention by providing a tubular means having an inlet opening for receiving liquid from the system, and an outlet opening for returning the liquid to the system, wherein an inlet conduit extends concentrically into the tubular means through the inlet opening thereof, wherein an annular space is formed between the inlet conduit and the tubular means, and wherein in a portion of the inlet conduit disposed in the tubular means the inlet conduit is provided with at least one aperture for introducing liquid therefrom into the annular space.

Accordingly, it is an object of this invention to provide a novel energy attenuation apparatus having one or more of the novel features of this invention as set forth above or hereinafter shown or described.

Another object of this invention is to provide a new method of attenuating energy in a system conveying liquid under pressure, the method of this invention having one or more of the novel features of this invention as set forth above or hereinafter shown or described.

Other objects, uses and advantages of this invention are apparent from a reading of the specification in conjunction with the accompanying schematic drawings, which form a part thereof and wherein:

BRIEF DESCRIPTION OF THE DRAWINGS

FIG. 8 is a view similar to that of FIG. 4 of yet another exemplary embodiment of an energy attenuation apparatus of this invention;

FIG. 9 is a view similar to that of FIG. 4 of a further exemplary embodiment of an energy attenuation apparatus of this invention;

FIG. 10 is a view similar to that of FIG. 4 of another exemplary embodiment of an energy attenuation apparatus of this invention;

FIGS. 21–23 show portions of inlet and/or outlet conduits or tuning cables that are provided with alternative configurations of apertures;

FIGS. 25 and 26 show various embodiments of tuning cable arrangements for use in conjunction with the energy attenuation apparatus of this invention;

DESCRIPTION OF PREFERRED EMBODIMENTS

Figure 1:
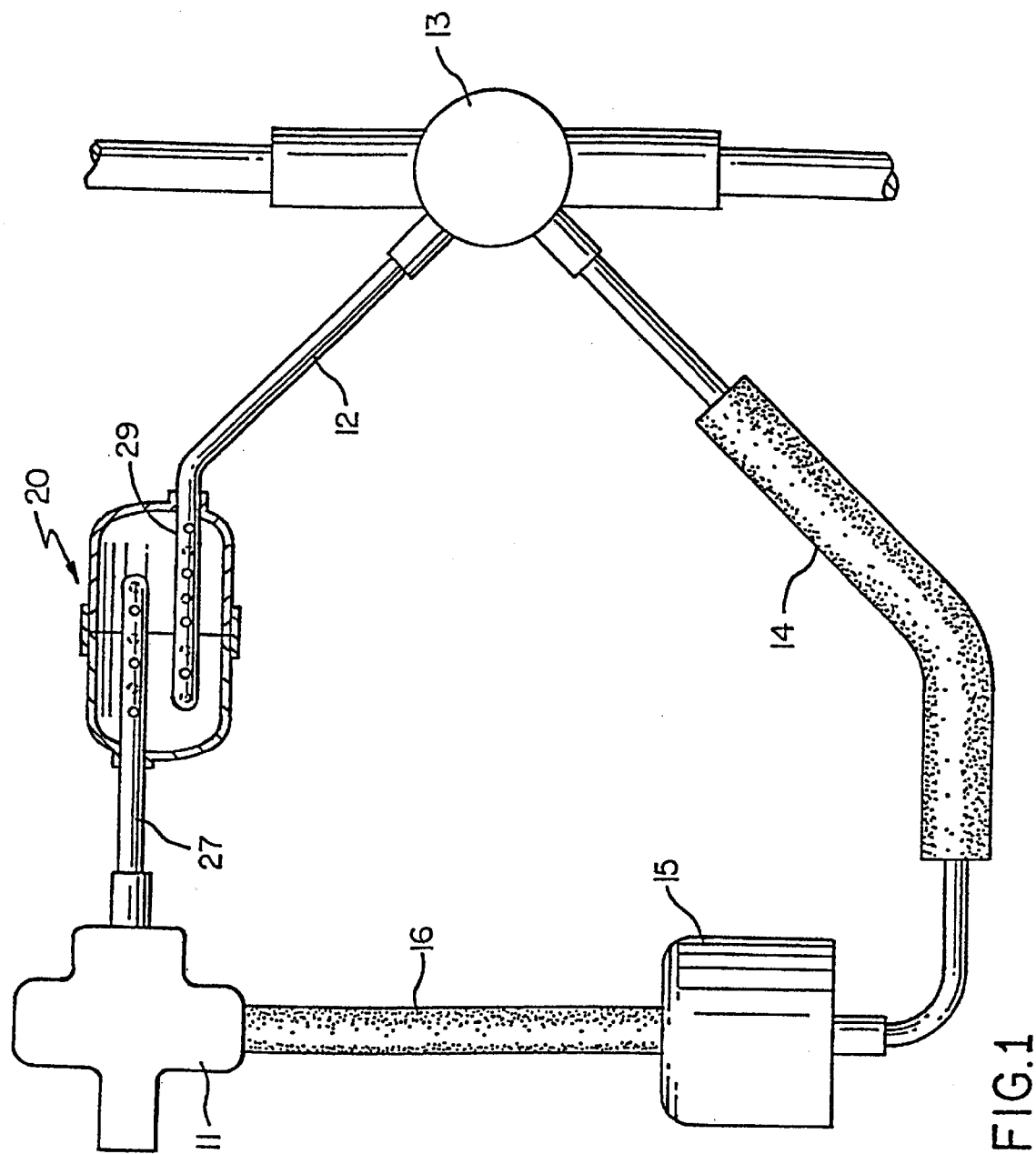
FIG. 1 illustrates a simplified automotive power steering system that incorporates one exemplary embodiment of the energy attenuation apparatus of this invention.
Figure 2:
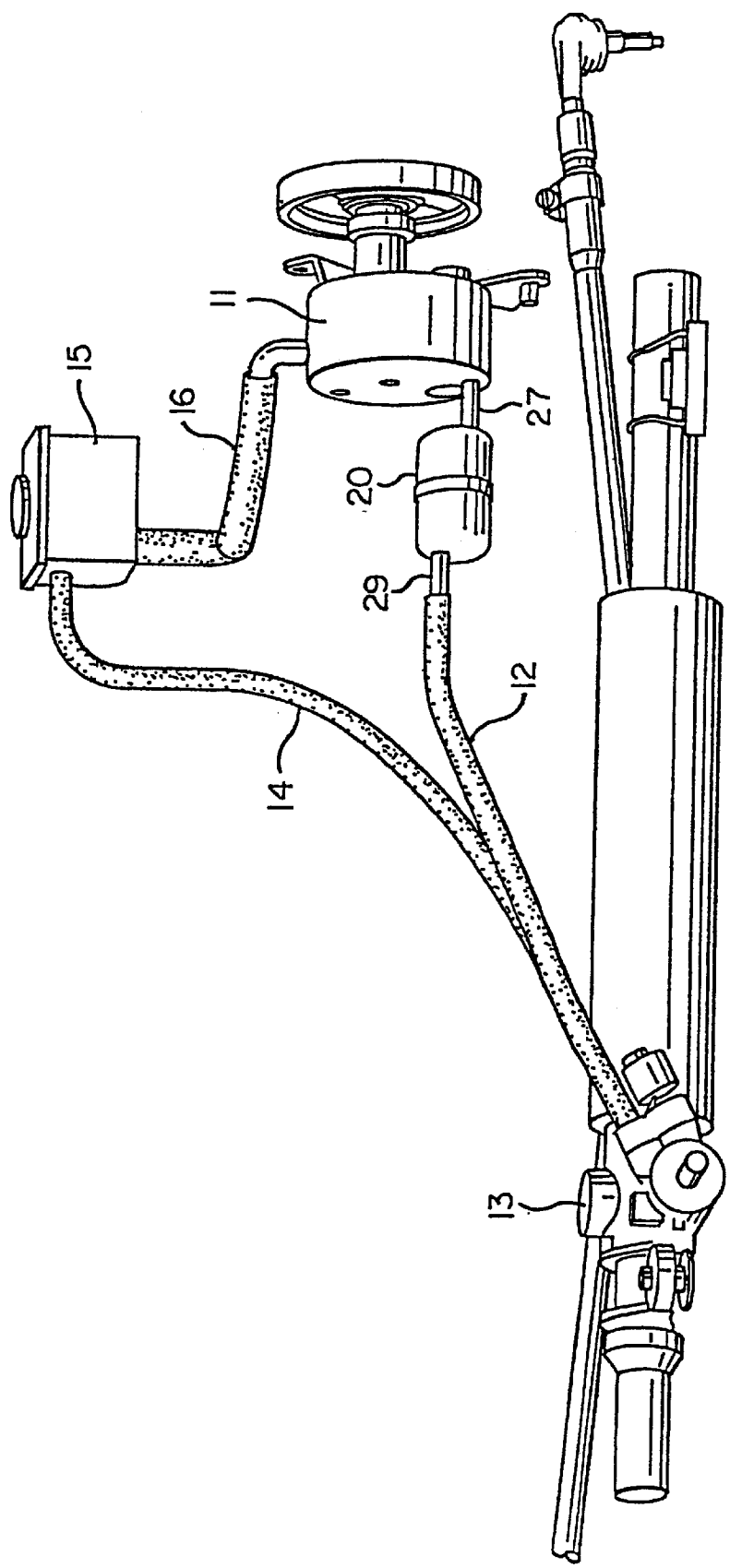
FIG. 2 shows a power steering system utilizing the inventive energy attenuation apparatus.

While the various features of this invention are hereinafter illustrated and described as providing an energy or sound attenuation apparatus for an automotive power steering system, it is to be understood that the various features of this invention can be utilized singly or in various combinations thereof to provide an energy attenuation apparatus for other systems that convey liquid under pressure.

Therefore, this invention is not to be limited to only the embodiments illustrated in the drawings, because the drawings are merely utilized to illustrate one of the wide variety of uses of this invention.

Referring now to the drawings in detail, FIG. 1 illustrates a simplified automotive power steering system. During operation, the power steering pump 11 generates pressure ripples that are transmitted through tubing, such as steel tubing, to the pressure line 12, the power steering gear 13, the return line 14, and the reservoir 15, and finally flow back to the pump 11 itself by means of the supply line 16. It should be noted that rather than being separated by a hose or similar conduit, the reservoir 15 and the pump 11 could actually be a single unit.

In order to greatly reduce such pressure ripples before they reach the gear 13 via the pressure line 12, and thereby eliminate or at least greatly reduce the power steering noise or vibration generated by the power steering pump 11, an energy attenuation apparatus of this invention, which is generally indicated by the reference numeral 20, is illustrated as being disposed in the pressure line 12 between the pump 11 and the gear 13. Various exemplary embodiments of the energy attenuation apparatus 20 and components and arrangements thereof are illustrated in FIGS. 2–28, and will be described in detail subsequently.

Figure 4:
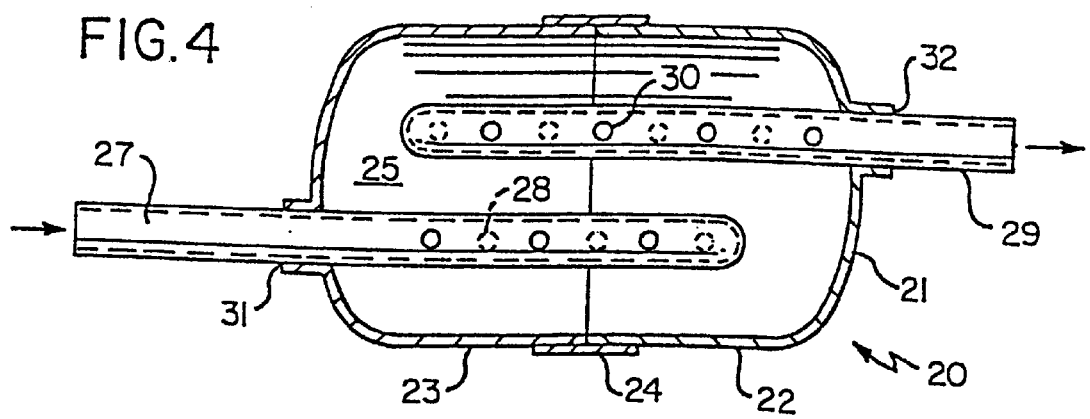
FIG. 4 is a cross-sectional view of one exemplary embodiment of the energy attenuation apparatus of this invention.

The energy attenuation apparatus 20 that is shown disposed in the pressure line 12 in FIG. 1 is shown in greater detail in FIG. 4. In particular, the energy attenuation apparatus 20 comprises a canister or housing 21 that in the illustrated embodiment is a two-part housing made up of the parts 22 and 23 that are interconnected by the ring 24. In this embodiment of the energy attenuation apparatus, a single chamber 25 is formed in the housing 21. It is to be understood that the size and shape of the housing 21 can vary with the space available to accommodate same as well as with the existing requirements. For example, a three-part housing could be used, including a central portion with identical caps or end portions on each side thereof.

As shown by the arrow, liquid enters the housing 21, for example from the pressure side of the pump 11, by means of an inlet conduit 27, such as a tube or pipe. As can be seen from FIG. 4, this inlet conduit 27 extends well into the chamber 25 of the housing 21. In addition, the inlet conduit 27 is provided with a plurality of apertures or holes 28 that allow the liquid to enter the chamber 25 from the conduit 27. From the chamber 25, which is also known as a mixing area or a flow control chamber, the liquid enters an outlet conduit 29 by means of a plurality of apertures or holes 30 formed therein. The inlet and outlet conduits 27 and 29 are sealingly disposed in the housing 21 in any convenient manner, as indicated schematically at the locations 31 and 32 respectively. As shown in FIG. 1 and the schematic view of FIG. 2 of a proposed power steering system utilizing the inventive energy attenuation apparatus, the outlet conduit 29 is connected to the pressure line 12 so that the liquid, in this case power steering fluid, can be conveyed to the gear 13.

Although the embodiment illustrated in FIG. 4 provides for a single, hollow chamber into which a straight inlet conduit extends and from which a straight outlet conduit emerges, it has also been found according to the teachings of this invention that other configurations are possible. For example, reference is now made to FIGS. 5–20, wherein other housing and conduit configurations of this invention are shown and are generally indicated by the reference numerals 20A–20P, wherein parts thereof similar to the energy attenuation apparatus 20 of FIG. 4 are indicated by like reference numerals that where appropriate are followed by the reference letter A, B, C, D, E, F, G, H, I, J, K, L, M, N, O, or P.

Figure 5:
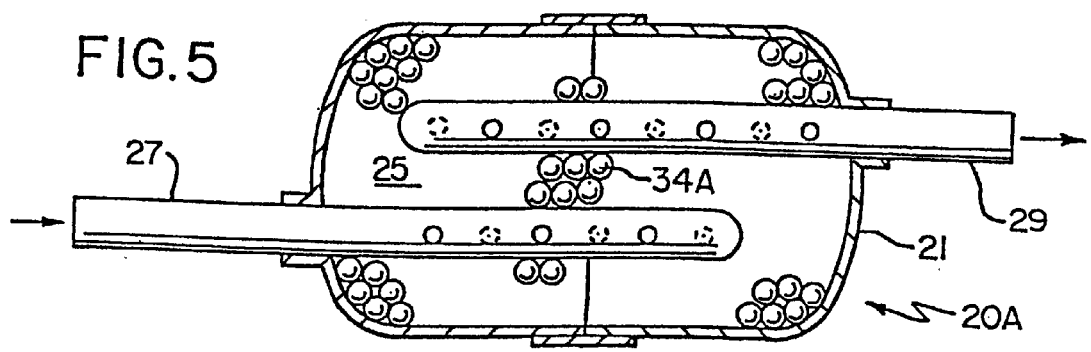
FIG. 5 is a view similar to that of FIG. 4 of a second exemplary embodiment of the energy attenuation apparatus of this invention.
Figure 6:
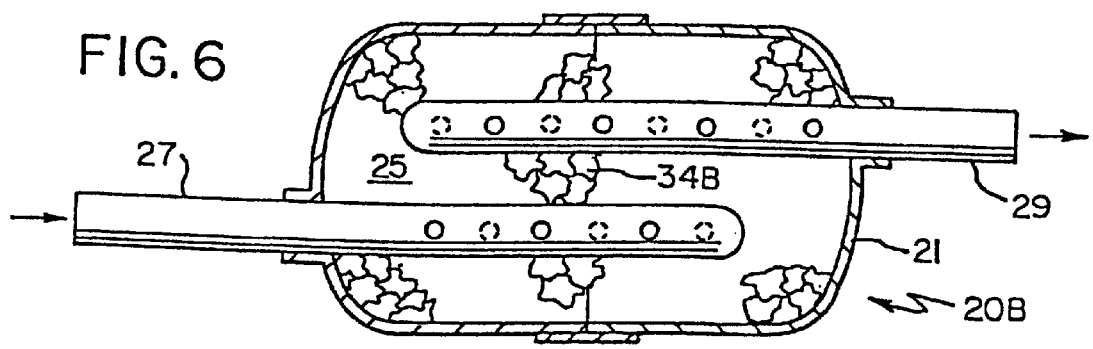
FIG. 6 is a view similar to that of FIG. 4 of a third exemplary embodiment of an energy attenuation apparatus of this invention.

The embodiments illustrated in FIGS. 5 and 6 differ from that shown in FIG. 4 only in that the chamber 25 is partially filled with a flow control or filler means. For example, the energy attenuation apparatus 20A of FIG. 5 shows a housing 21 having a chamber 25 that is partially filled with spherical filler means 34A. These filler means 34A can be solid or hollow beads or balls made of steel, rubber, plastic, or any other suitable material, and help to increase the dissipation of energy. The filler means 34A, as well as the filler means to be discussed subsequently, should be made of a non-corrosive material and should be able to withstand temperatures up to 300° F.

FIG. 6 illustrates an embodiment of an energy attenuation apparatus 20B wherein the housing 21 has a chamber 25 that is partially filled with irregularly shaped flow control or filler means 34B. As was the case with the filler means 34A of FIG. 5, the filler means 34B can be made of any suitable material, again solid or hollow, and could even comprise gravel. A sponge or foam-like filler means could also be used as long as it is compatible with operating parameters.

Figure 7:
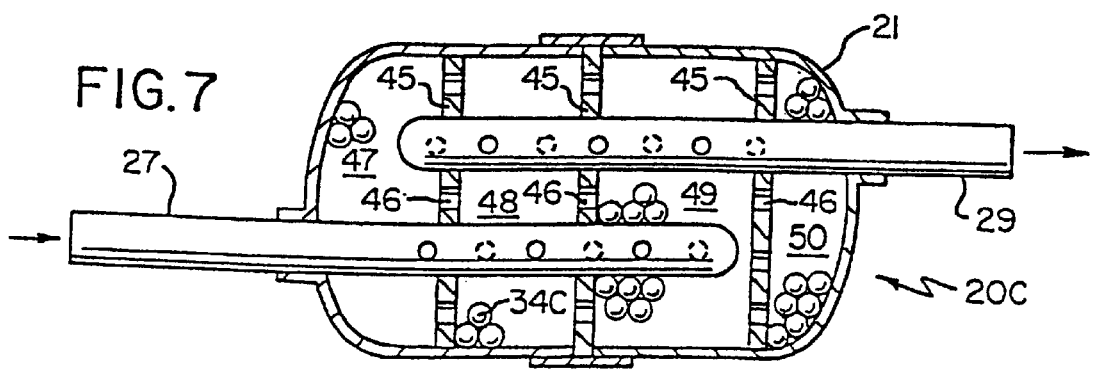
FIG. 7 is a view similar to that of FIG. 4 of a further exemplary embodiment of an energy attenuation apparatus of this invention.

The energy attenuation apparatus 20C illustrated in FIG. 7 shows a housing 21 having chamber means that is not only partially filled with filler means 34C, such as steel balls, but is also subdivided into a plurality of chambers by baffle plates, as will be discussed in greater detail subsequently.

FIGS. 8–10 illustrate how either one or both of the inlet and outlet conduits can be bent, rather than having the straight configuration of the previous embodiments. For example, the outlet conduit 29D of the energy attenuation apparatus 20D is bent at right angles prior to exiting the housing 21. Similarly, the inlet conduit 27E of the energy attenuation apparatus 20E of FIG. 9 is bent at right angles after having entered the chamber 25 of the housing 21. It should be noted that the chambers 25 of the energy attenuation apparatus 20D and 20E could also be provided with a flow control or filler means.

In the energy attenuation apparatus 20F illustrated in FIG. 10, both the inlet conduit 27F and the outlet conduit 29F are bent at right angles within the housing 21 although they could also extend linearly as in some of the previously described embodiments. The attenuation apparatus 20F also differs from the previously illustrated embodiments of FIGS. 4–6, 8 and 9 in that the housing 21 does not contain a single chamber, but rather is divided into two chambers 35 and 36. This division of the housing 21 into two chambers is effected by a further flow control means in the form of a baffle 37, which in the illustrated embodiment is disposed in the center of the housing 21. The baffle plate 37 is provided with a plurality of holes 38 in order to allow liquid to flow from the chamber 35 to the chamber 36. Again, one or both of the chambers 35, 36 can be partially filled with filler means. In addition, multiple baffle plates could be provided, either adjacent one another or further subdividing the housing 21 into additional chambers, whereby the conduits 27F, 29F could even extend through some of the baffles. For example, FIG. 7 illustrates a housing 21 that is provided with three such baffles 45, each of which is provided with a plurality of holes 46 in order to allow liquid to flow from the inlet conduit 27 to the outlet conduit 29 through the various chambers 47–50 into which the housing 21 is subdivided by the baffle plates 45. In the illustrated embodiment, the inlet and outlet conduits 27, 29 are illustrated as extending far into the housing 21, thus extending through two or even all three of the baffle plates 45. It will be understood that the inlet and outlet conduits 27, 29 need not extend so far into the housing 21, and could, if desired, respectively extend through only a single one of the baffles 45.

Although in the presently preferred embodiments the inlet conduit 27 is illustrated as being provided with six holes, while the outlet conduit 29 is shown as being provided with eight holes 30, the number of holes as well as the dimensions and shapes thereof could vary, although it is presently provided that the inlet conduit 27 have a lesser number of holes or apertures than does the outlet conduit 29. The reverse arrangement would be theoretically possible, whereby the important feature is that the number of holes of the inlet and outlet conduits differ from one another. The number of holes, and the other parameters thereof, will vary as a function, for example, of the size of the pump as well as of the operating conditions. In addition, the holes can be provided on only one side of a given conduit, or on both sides thereof. In addition, although in the illustrated embodiments the holes are showing as being aligned with one another in a longitudinal direction of the conduit, such holes could also be provided in a staggered or otherwise random configuration. It is expedient to have the holes of the inlet conduit angularly offset from those of the outlet conduit so that there is no direct flow between the conduits. If each conduit has only one row of holes, these rows could be offset by 180° relative to one another. If each conduit has two rows of holes, preferably disposed 90° apart, the rows of one of the conduits would be disposed so as to be 90° from the closest row of the other conduit.

Although the baffle 37 of the embodiment of the energy attenuation apparatus 20F shown in FIG. 10 is illustrated as extending in a transverse direction, a similar baffle plate could also be provided in the embodiments of FIGS. 4–6, 8 and 9, wherein such baffle plate would then be disposed in a longitudinal direction of the housing 21 between the inlet and the outlet conduits.

It should also be noted that the inlet and outlet conduits need not necessarily have the same length within the housing 21. In addition, the diameters thereof need not be the same. In addition, the diameter or even the shape of the holes of the inlet and outlet conduits can differ from one another.

Figure 11:
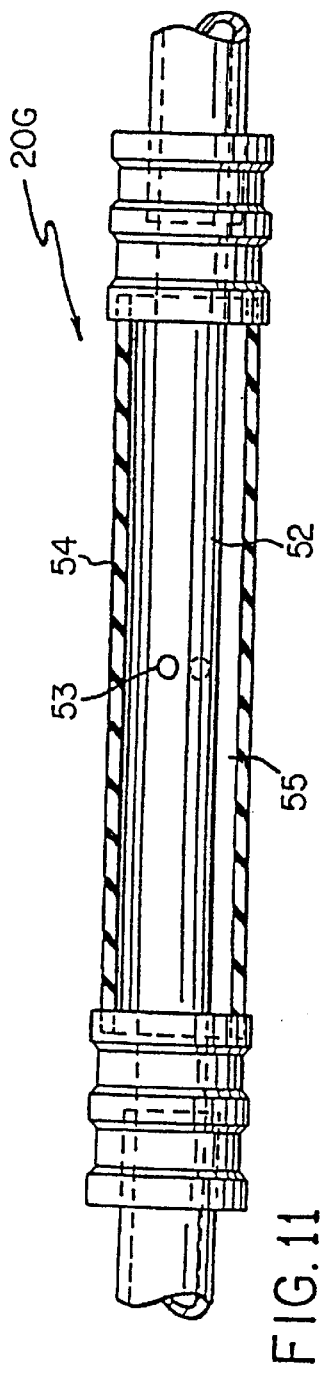
FIG. 11 is a cross-sectional view of another exemplary embodiment of the energy attenuation apparatus of this invention.

Although the previously described embodiments provide for a canistertype housing, it has been found according to the teachings of this invention that a tubular housing, for example a hose or casing, could also be used. Furthermore, although the previously described embodiments provide for separate inlet and outlet conduits 27, 29, it has also been found according to the teachings of this invention that the inlet and outlet conduits could be a single conduit. For example, reference is now made to FIG. 11, wherein a single, continuous tube, tuning cable or conduit 52 of metal or polymeric material, such as Teflon, is illustrated. Although a straight conduit 52 has been shown, other configurations are also possible. As with the previous embodiments, the embodiment of the energy attenuation apparatus 20G shown in FIG. 11 is also provided with apertures in the peripheral surface of the conduit. In particular, in the embodiment illustrated in FIG. 11 the apertures 53 are in the form of holes, with two holes that are 180° apart being shown approximately in the middle of the tube 52, although the holes 53 could also be disposed closer to one end, for example a third of the way from the inlet end. As discussed previously, various numbers and arrangements of such apertures 53 are possible, and it would even be possible to provide only a single aperture since only a single conduit is present. For example, four holes could be provided, with two holes being provided in the left hand portion of the conduit 52 and two further holes being provided in the right hand portion of the conduit 52. In addition, four holes spaced 90° from one another could be disposed around the center of the tube or conduit 52. In addition, the apertures 53 can have any other desired shape, such as an oval shape.

In contrast to a canister-type housing, in the embodiment illustrated in FIG. 11 the single conduit 52 is surrounded by a rubber hose 54, with a narrow annular space 55 of from 1/32 to 3/8 of an inch or longer being formed between the outer periphery of the conduit 52 and the inner periphery of the hose 54. The annular space 55 serves for receiving hydraulic fluid from the conduit 52 via the apertures 53 thereof; the liquid is again returned to the conduit 52 via the apertures 53. The hose 54 can also be made of polymeric material, or, as shown in the embodiment of the energy attenuation apparatus 20I of FIG. 13, can be made of metal. The tubular means 54, whether a hose or a casing, has a right-cylindrical cross-sectional configuration.

Figure 12:
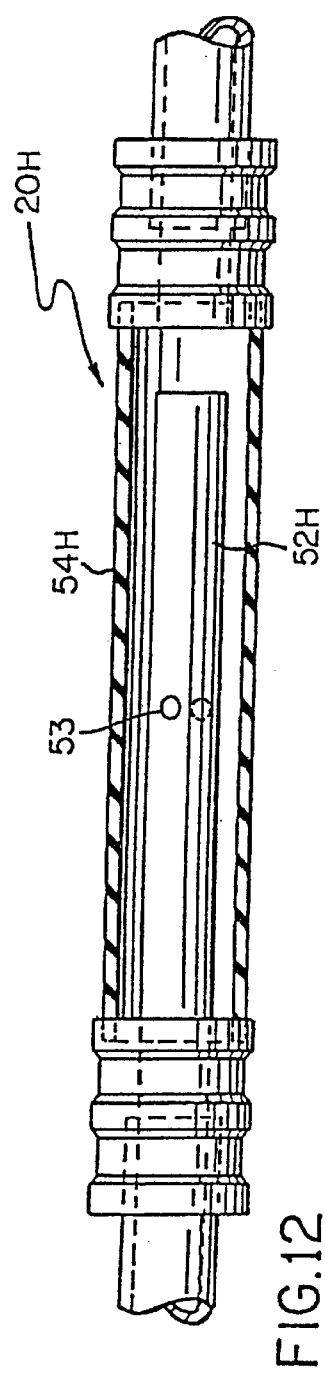
FIG. 12 is a view similar to that of FIG. 11 of yet another exemplary embodiment of an energy attenuation apparatus of this invention.
Figure 13:
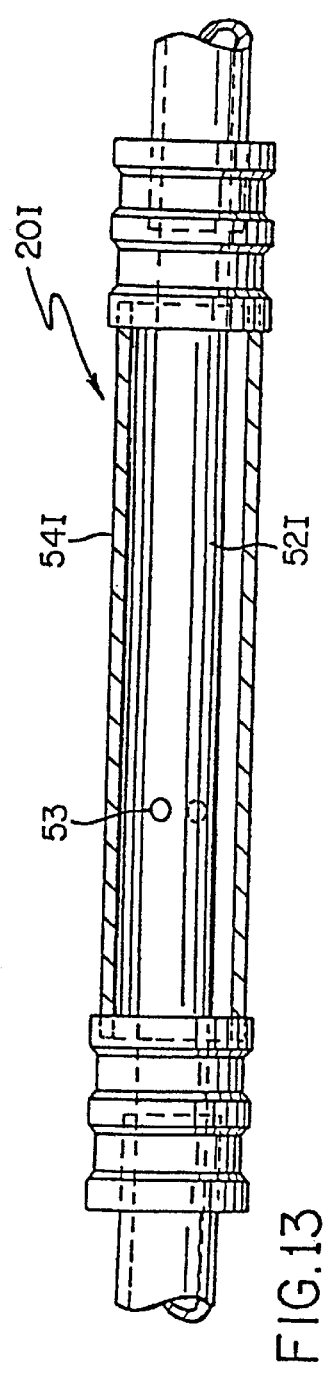
FIG. 13 is a view similar to that of FIG. 11 showing a further exemplary embodiment of an energy attenuation apparatus of this invention.

In the embodiment of the energy attenuation apparatus 20H illustrated in FIG. 12, a single conduit 52H is again shown. However, in this embodiment the conduit 52H does not extend all the way from the inlet end to the outlet end of the hose 54H, but stops short of the outlet end; the conduit 52H can end 0.25 to 9 inches or more from the outlet end of the hose 54H, and in one exemplary embodiment of the present invention, for a conduit length of 11 inches, ends 1.5 inches from the outlet end of the hose 54H.

Figure 14:
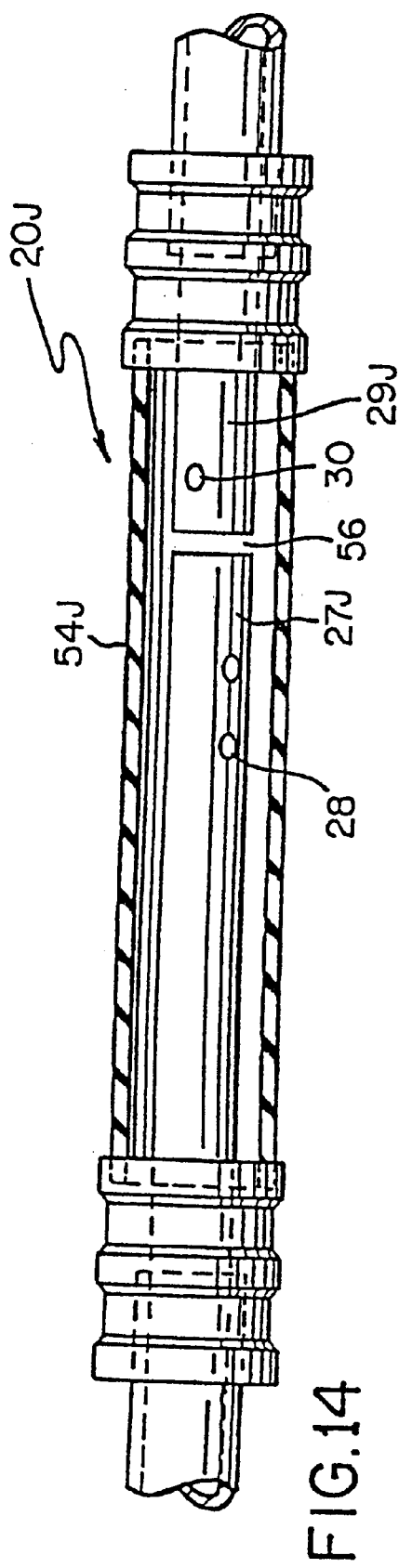
FIG. 14 is a view similar to that of FIG. 11 showing a further exemplary embodiment of an energy attenuation apparatus of this invention.

A combination of the concepts illustrated in the apparatus of FIGS. 4–10 on the one hand and FIG. 11 on the other hand is illustrated by way of example in the energy attenuation apparatus 20J of FIG. 14. In this embodiment, again two separate inlet and outlet conduits 27J, 29J are provided. However, instead of being disposed next to one another, these inlet and outlet conduits are aligned with one another and are separated from one another by a slight gap 56, for example a gap of approximately ⅟₃₂ (presently preferred) to ⅛ of an inch, or even up to one inch or more. Again, the inlet conduit 27J is provided with apertures 28, while the outlet conduit 29J is provided with apertures 30.

Figure 15:
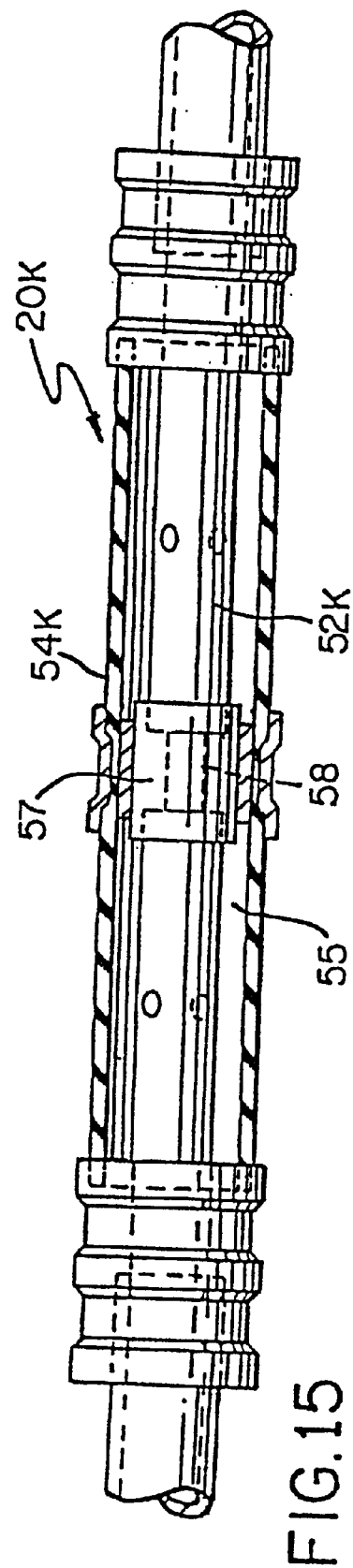
FIG. 15 is a view similar to that of FIG. 11 showing another exemplary embodiment of an energy attenuation apparatus of this invention with a restrictor.

The embodiments of the energy attenuation apparatus of FIGS. 11–14 can also be provided with any of the other features of the previously discussed embodiments, such as the flow control means or filler means 34, as well as one or more flow control means in the form of baffle plates. In addition, a restrictor means could be provided in one or more of the conduit means 27, 29 or 52. For example, the energy attenuation apparatus 20K of FIG. 15 shows such a restrictor 57 disposed in the central portion of the conduit 52. Such a restrictor 57 could be provided at either end of the conduit 52, or at both ends, and could also be provided in one or both of the inlet and outlet conduits 27, 29 of some of the previously described embodiments. It is to be understood that the passage 58 through the restrictor 57 has an inner diameter that is smaller than the inner diameter of the tube or conduit in which it is disposed. For example, the passage 58 of the restrictor 57 could have a diameter of from 0.36 to 0.10 of an inch.

Figure 16:
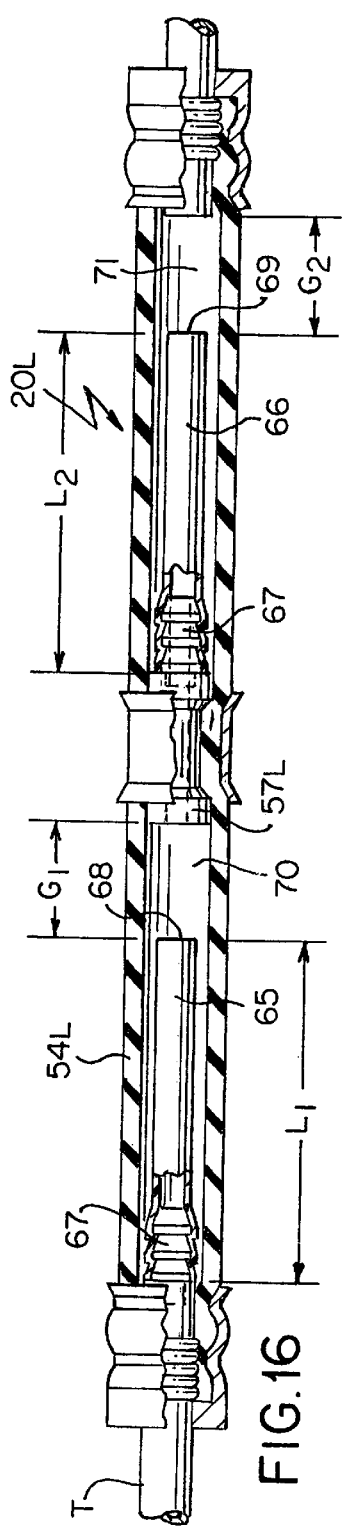
FIG. 16 shows a further exemplary embodiment of an energy attenuation apparatus of this invention.

Instead of both conduits or tuning cable means being connected to the restrictor 57 as in the embodiment of FIG. 15, in the embodiment of the energy attenuation apparatus 20L shown in FIG. 16, the inlet end of one of the tuning cables 65 is connected in a fluid communicating manner to the tubing T of the liquid conveying means, for example via the connector 67, a specific embodiment of which is disclosed in applicant's co-pending application docket number 00-05. The other tuning cable 66 that is disposed in the right hand chamber of the apparatus is connected to the restrictor 57, again for example by means of a connector 67.

In the embodiment of the energy attenuation apparatus 20L illustrated in FIG. 16, the ends of the tuning cables 65 and 66 are open, so that the liquid received by the tuning cable 65 from the tubing T can be conveyed into the chamber 20, while the liquid received by the tuning cable 66 from the chamber 70 via the restrictor 57L can be conveyed into the chamber 71.

The tuning cables 65 and 66 are made of polymeric material. Therefore, since the speed of sound is much greater for metal, these tuning cables of polymeric material can be made proportionately shorter than known tuning cables of wound metal strips, which provides a distinct advantage where such an energy attenuation apparatus is to be used in an area where space is limited.

Whereas in the embodiment illustrated in FIG. 16 only the ends 68, 69 of the tuning cables 65, 66 are open, it is also possible to additionally provide one or more apertures or holes in the peripheral surface of at least one of the tuning cables. For example, in the embodiment of the energy attenuation apparatus 20M illustrated in FIG. 17, the left hand turning cable 65M is provided with two holes 73 that are disposed 180° from one another on the periphery of the tuning cable. Instead of being provided on the left hand tuning cable 65M, it would alternatively be possible to provide one or more holes on only the right hand tuning cable 66M. Finally, one or more holes could be provided on both of the tuning cables 65M and 66M.

Figure 17:
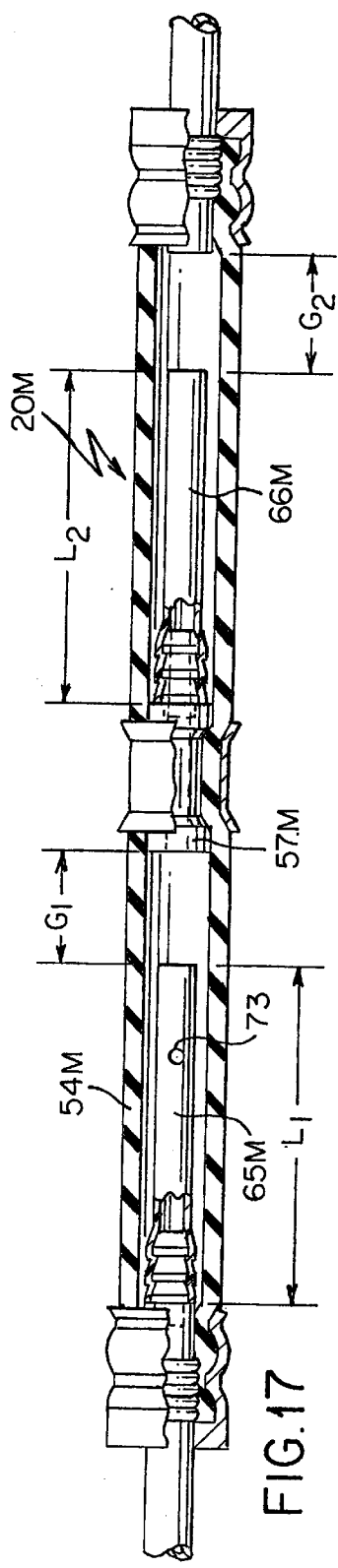
FIG. 17 is a view similar to that of FIG. 16 showing another exemplary embodiment of an energy attenuation apparatus of this invention.

Although the embodiments of the energy attenuation apparatus of FIGS. 16 and 17 show only two chambers, each of which is provided with a tuning cable, it would also be possible to provide three or more chambers. Therefore, in the embodiment of the attenuation apparatus 20N illustrated in FIG. 18, three chambers are provided in the hose means 54N, with the chambers being separated from one another by respective restrictors 57N. Each of the chambers is provided with a respective tuning cable 65N, 66N or 74. As with the previous embodiments, the tuning cables are connected in a convenient manner at one end, and are spaced from the other end of the chamber, to which they deliver liquid via their open ends. Again, optionally one or more of the tuning cables can be provided with holes, as illustrated by way of example only by the hole 73 illustrated in the tuning cable 65N.

Figure 18:
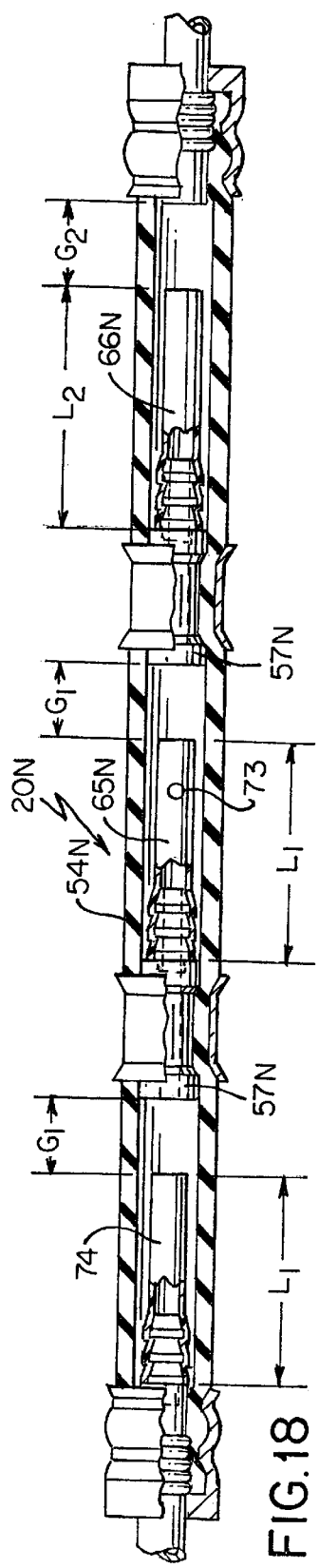
FIG. 18 shows a further exemplary embodiment of an energy attenuation apparatus of this invention.
Figure 19:
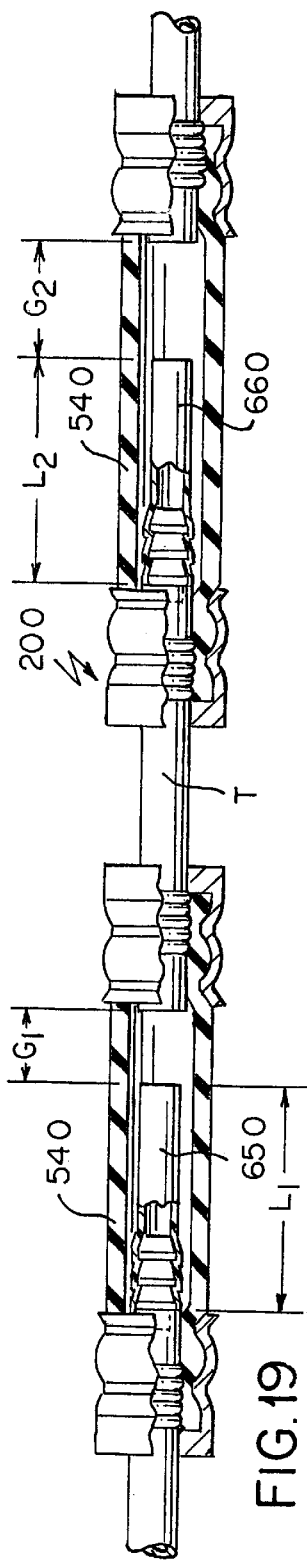
FIG. 19 is a view similar to that of FIG. 16 showing yet another exemplary embodiment of an energy attenuation apparatus of this invention.
Figure 20:
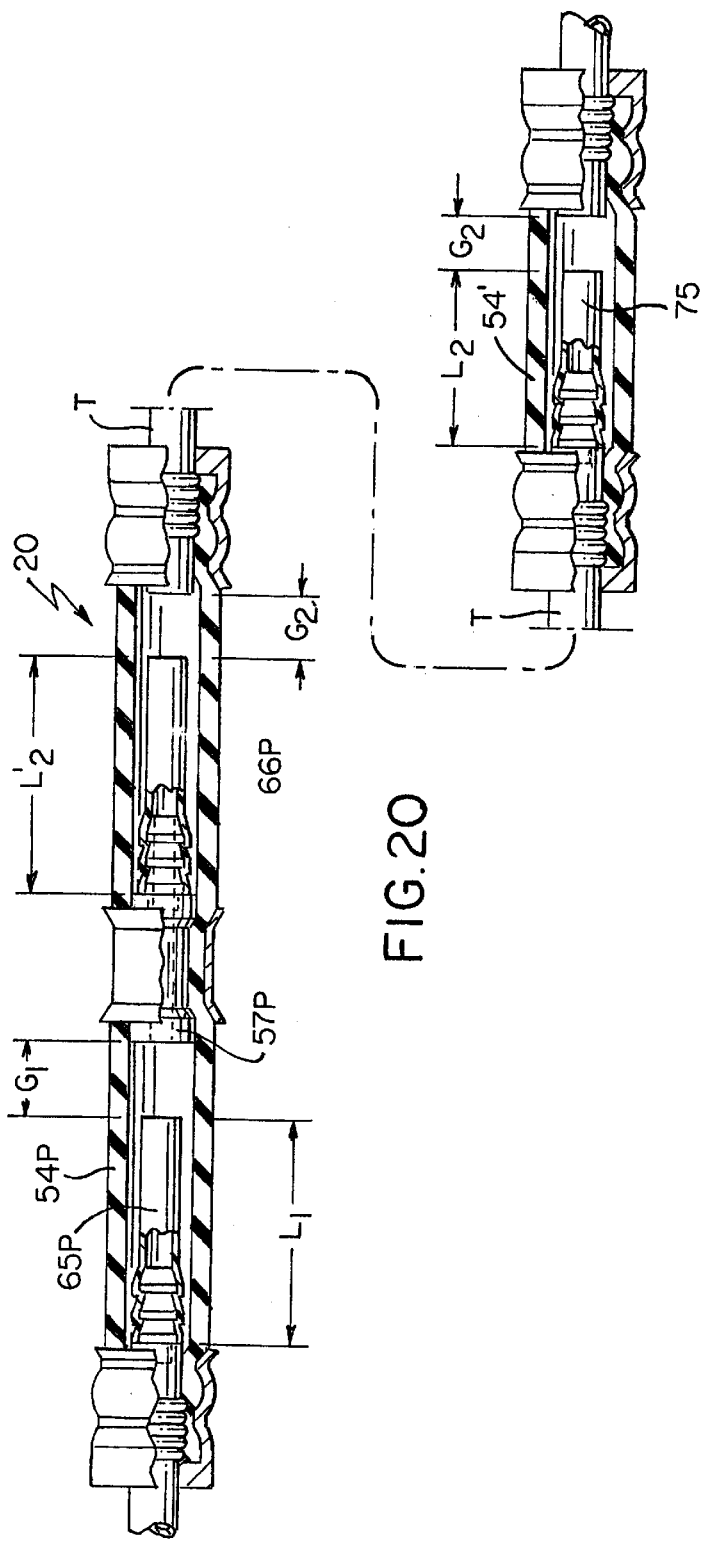
FIG. 20 is a view similar to that of FIG. 18 showing another exemplary embodiment of an energy attenuation apparatus of this invention.

In the embodiments of the inventive energy attenuation apparatus of FIGS. 16–18, a single continuous hose 54 has been illustrated that is divided by one or more restrictors 57 into two or more chambers, each of which is provided with a respective tuning cable. However, it would also be possible to provide separate chambers in another fashion. For example, in the embodiment of the energy attenuation apparatus 20O illustrated in FIG. 19, two separate hose sections 54O are provided. These two hose sections are separated from one another by a section of tubing T. The ends of the polymeric tuning cables 65O and 66O are again open, and no holes need be provided on the peripheral surfaces of the tuning cables. However, as with the previously discussed embodiments, one or both of the tuning cables can be provided with one or more holes. Although in the embodiment of FIG. 19 only two hose sections separated by the tubing T are illustrated, it would also be possible to provide three or more chambers as in the embodiment illustrated in FIG. 18. In such a case, all three chambers could be formed by separate hose sections that are separated by respective sections of tubing T, or two of the chambers could be formed by a single continuous hose that is divided by a restrictor into two chambers, similar to the embodiments of FIGS. 16 or 17, with a third chamber being formed by a separate hose section that is connected to the two-chamber portion by a section of tubing T. For example, in the embodiment of the energy attenuation apparatus 20P illustrated in FIG. 20, two chambers are provided in the hose means 54P, with the chambers being separated from one another by the restrictor 57P, and a third chamber is provided in the right hand hose section 54', with this hose section being separated from the hose section 54P by a section of tubing T. Each of the chambers is provided with a respective tuning cable 65P, 66P or 75. The tuning cables are again connected in a convenient manner at one end, and are spaced from the other end of their chamber, to which they deliver liquid via their open ends. As with the previous embodiments, one or more of the tuning cables can be provided with holes.

With regard to the embodiments of the energy attenuation apparatus illustrated in FIGS. 16–20, the end of the tuning cables shown connected has always been the left hand end. However, it should be understood that at least for some of the tuning cables the situation could be reversed, with the right hand ends being connected. Thus, by way of example, in the embodiment illustrated in FIG. 16 the tuning cable 65, rather than being connected to the tubing T via the connector 67, could be connected at the right hand end to the restrictor 57L. In such a case, the left hand end of the tuning cable 65 would be open, and would be spaced from the inlet end of the chamber 70. Similarly, the tuning cable 66 could be connected at the outlet end of the chamber 71 with the open end of the tuning cable 66 then being spaced from the restrictor 57L.

The tuning cables of, for example, the embodiment of the inventive energy attenuation apparatus 20L of FIG. 16 could have a length of 60 mm to 500 mm. With the ratio of the tuning cable 65 to the tuning cable 66 ranging from 5:1 to 1:5. For example, in one exemplary embodiment of the present invention the tuning cable 65 has a length of 300 mm, whereas the tuning cable 66 has a length of 150 mm. In those embodiments where a third or further tuning cable is provided, such tuning cable would also have a length of 60 mm–500 mm.

As indicated previously, the open ends of the tuning cables of the embodiments illustrated in FIGS. 16–20 are spaced from the ends of their respective chamber. Such spacing is presently contemplated as ranging from 10 mm to 254 mm, and in presently preferred embodiments ranges from 30–40 mm.

As with the previously described embodiments, the conduit or hose means of the embodiments of FIGS. 16–20 can be made of rubber, metal or polymeric material. The various tubing T described are generally contemplated as being made of metal, but can also be made of rubber or polymeric material.

Although the inlet and outlet conduits 27, 29 illustrated in the previously described embodiments have primarily been provided with spherical holes 28, 30, it is to be understood that any other desired shape could also be used. By way of example only, FIGS. 21–23 show some other shapes for the holes in the inlet and outlet conduits. For example, the inlet and/or outlet conduit 40 illustrated in FIG. 21 is provided with oval apertures 41. The inlet and/or outlet conduit 42 of FIG. 22 is provided with triangular apertures 43. And the inlet and/or outlet conduit 44 of FIG. 23 is provided with rectangular apertures 45.

It should also be noted that although in some of the illustrated embodiments the inlet and outlet conduits are shown as having closed ends within the chamber or chambers of the housing 21 or hose 54, the ends of the inlet and/or outlet conduits can also be opened, or could also be provided with holes.

Figure 3:
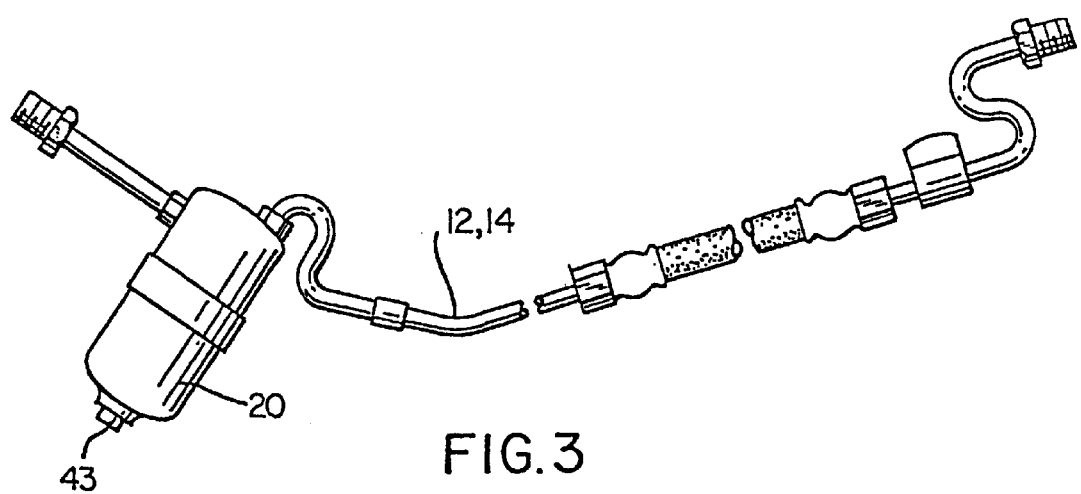
FIG. 3 illustrates one exemplary embodiment of the inventive energy attenuation apparatus in a specific pressure line or return line of an automotive power steering system.
Figure 24:
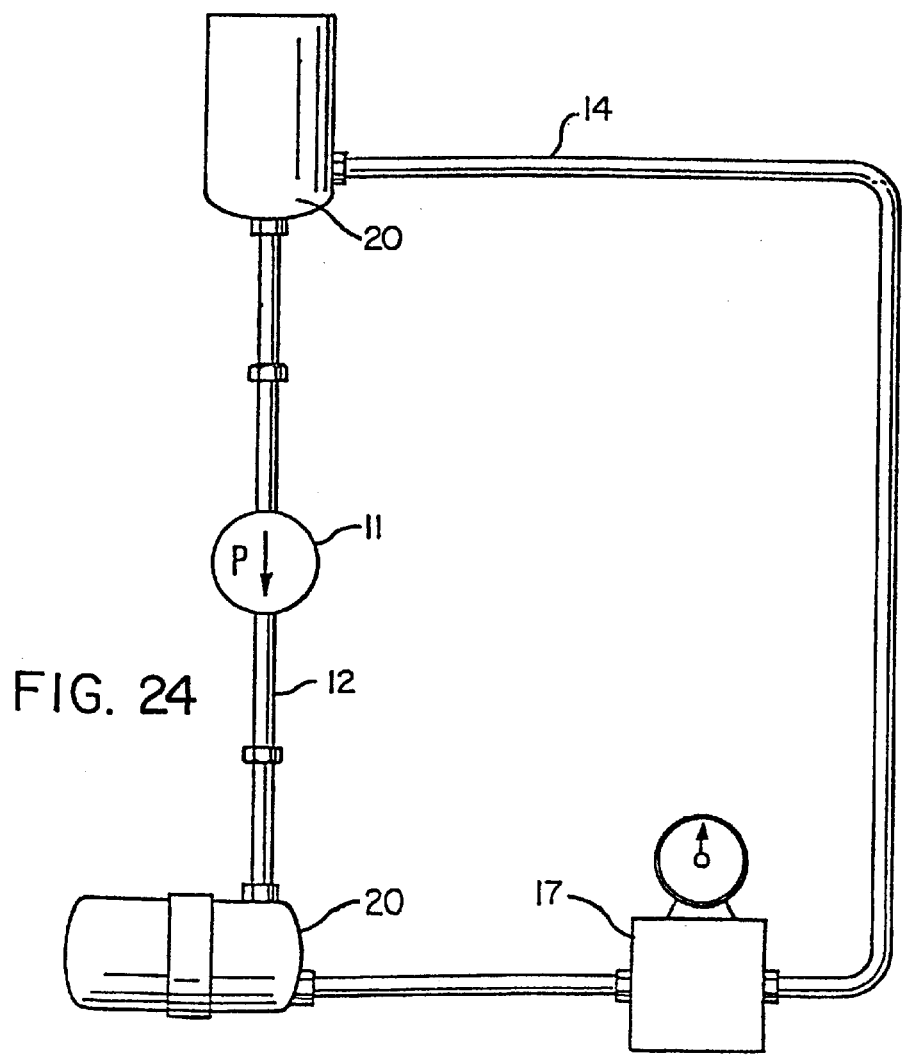
FIG. 24 illustrates a simplified automotive power steering system in which are disposed two energy attenuation apparatus of this invention.

It should furthermore be noted that although the inventive energy attenuation apparatus 20 has been illustrated in FIG. 1 as being disposed between the pump 11 and the gear 13, it is believed that such an attenuation apparatus could alternatively be disposed between the gear 13 and the reservoir 15 in the return line 14 in order to reduce vibration caused by the power steering gear 13. Furthermore, two attenuation apparatus could be provided. For example, FIG. 24 shows a system having two energy attenuation apparatus 20, one in the pressure line 12 to a control valve 17 (similar to the gear 13 of FIG. 1), and another in the return line 14. FIG. 3 illustrates an exemplary embodiment of an actual pressure or return line (bent to accommodate space requirements) in which is disposed an inventive energy attenuation apparatus 20, which in this embodiment is provided with an optional venting means 43.

Figure 27:
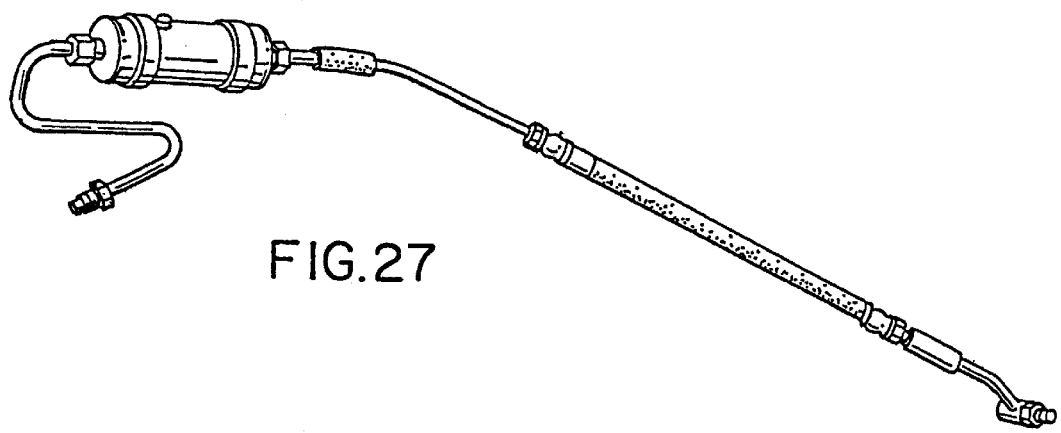
FIG. 27 illustrates one exemplary embodiment of the inventive energy attenuation apparatus of the present invention in conjunction with a further attenuation apparatus in a specific pressure line or return line of an automotive power steering system.
Figure 28:
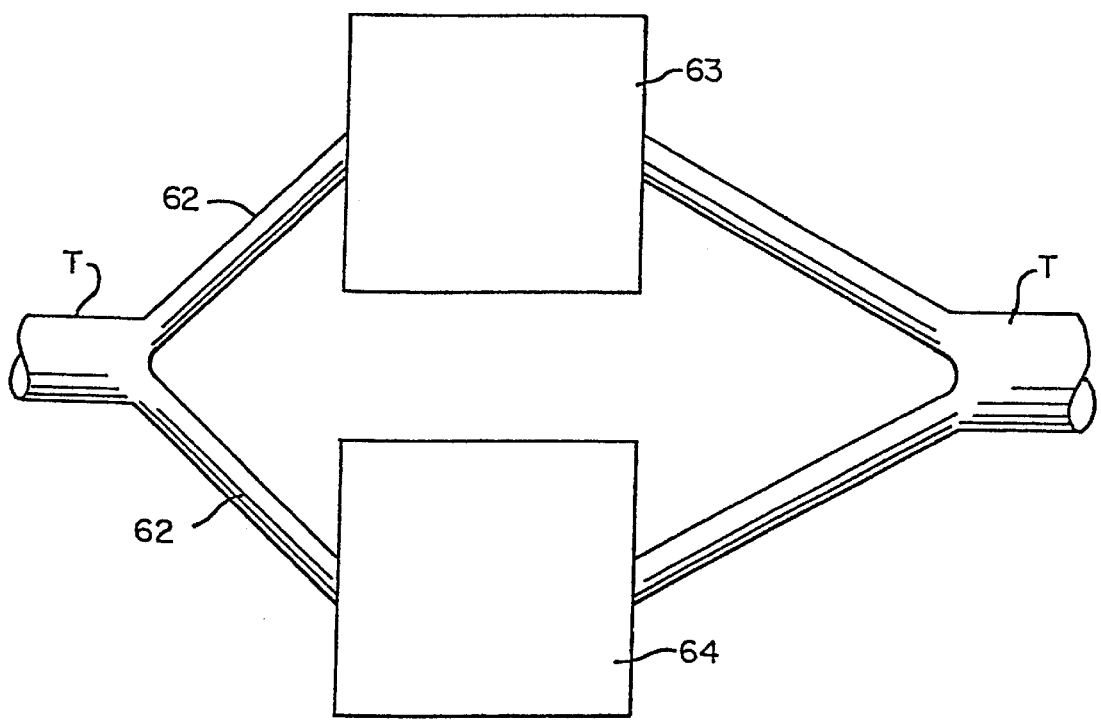
FIG. 28 is a partial block diagram showing one arrangement for use in conjunction with the present invention.

The inventive energy attenuation apparatus can also be used in conjunction with a variety of other sound and vibration attenuation apparatus, which are then also disposed in the pressure line 12 and/or the return line 14. For example a ¼ wave cable tuning assembly can be provided, for example by disposing a wound steel cable in a separate hose section. Examples of such tuning cable arrangements in hose sections are shown in FIGS. 25 and 26, wherein FIG. 25 shows a single tuning cable 59 disposed in the hose section or conduit means 60, whereas FIG. 26 shows two separate tuning cables 59 disposed in a hose section or conduit means 60. If the tuning cable or cables are made of polymeric material, such as Teflon, they can also be provided with apertures in the peripheral surface thereof. An example of a known wound metal tuning cable is disclosed in the aforementioned patent to Klees, U.S. Pat. No. 3,323,305, which patent has been incorporated into this disclosure. The tuning cable arrangements in the conduit means 60 can be disposed in series with the inventive energy attenuation apparatus, as illustrated in FIG. 27, or can be disposed in parallel therewith. Other sound and vibration attenuation apparatus are also known. For example, reference is made to U.S. Pat. No. 4,611,633 (Buchholz et al), U.S. Pat. No. 5,172,729 (Vantelini) and U.S. Pat. No. 5,201,343 (Zimmermann et al) whereby such U.S. Patents are also being incorporated into this disclosure by this reference thereto. Furthermore a spring-type energy attenuation device as disclosed in applicants' copending U.S. patent application Ser. No. 08/853,770 could also be provided, whereby the disclosure of such application is also incorporated into this disclosure by this reference thereto. One or more of such other attenuation apparatus could also be used in conjunction with the energy attenuation apparatus 20–20P of the present invention. For example, FIG. 28 shows an arrangement where the tubing T is split into branches 62, each of which leads to an energy attenuation apparatus that is schematically indicated by one of the boxes 63 or 64. This parallel arrangement can either be disposed in series with one of the inventive attenuation apparatus 20–20P, or one of the boxes 63, 64 can contain an inventive energy attenuation apparatus while the other box contains a known attenuation device. Furthermore, both boxes 63 and 64 can contain the same or different ones of the inventive energy attenuation apparatus. It should also be noted that two or more of the inventive energy attenuation apparatus could be disposed in series and/or in parallel with one another. For example, in the exemplary embodiment illustrated in FIG. 3, the portion shown as a hose section can be one or more of the embodiments illustrated in FIGS. 11–20. In addition although FIG. 3 shows a canister type energy attenuation apparatus 20, this could be replaced by another one of the embodiments of FIGS. 11–20, or any one of the aforementioned alternative attenuation apparatus, including the apparatus of applicants' copending U.S. patent application Ser. No. 09/006,068, whereby the disclosure of such application is also incorporated into this disclosure by this reference thereto.

In one exemplary embodiment of the energy attenuation apparatus 20 of this invention as illustrated in FIG. 4, the housing 21 and the inlet and outlet conduits 27, 29 were made of stainless steel. The housing 21 had an approximately cylindrical shape, and in a small embodiment thereof had a length of approximately 85 mm, a diameter of approximately 50.1 mm, and a thickness of approximately 1 mm. The stainless steel inlet and outlet conduits 27, 29 had an inner diameter of approximately 9.5 mm (⅜ of an inch) and a thickness of approximately 1 mm. The diameter of the holes in the inlet and outlet conduits 27, 29 was approximately 3.89 mm.

In order to provide sufficient volume or space between the outer periphery of the inner conduit or conduits and the interior of the housing or canister, the ratio of the diameter of the housing means to the diameter of the conduit should be at least 2:1, and could be as much as 10.7:1 or even greater. The housing means 21 can be a substantially cylindrical canister, or could be egg shaped or even spherical. A large volume can also be achieved for the narrow hose or casing embodiments by providing for a very long hose or casing, for example one having a length of several feet, such as even seven feet or longer if sufficient space is available.

In exemplary embodiments of the energy attenuation apparatus 20G of FIG. 11, the hose 54 had a length of approximately 5 to 40 inches or greater and a diameter of ⅜ to ⅝ of an inch or greater. The diameter of the conduit 52 was ⅜ of an inch or less.

Figure 29:
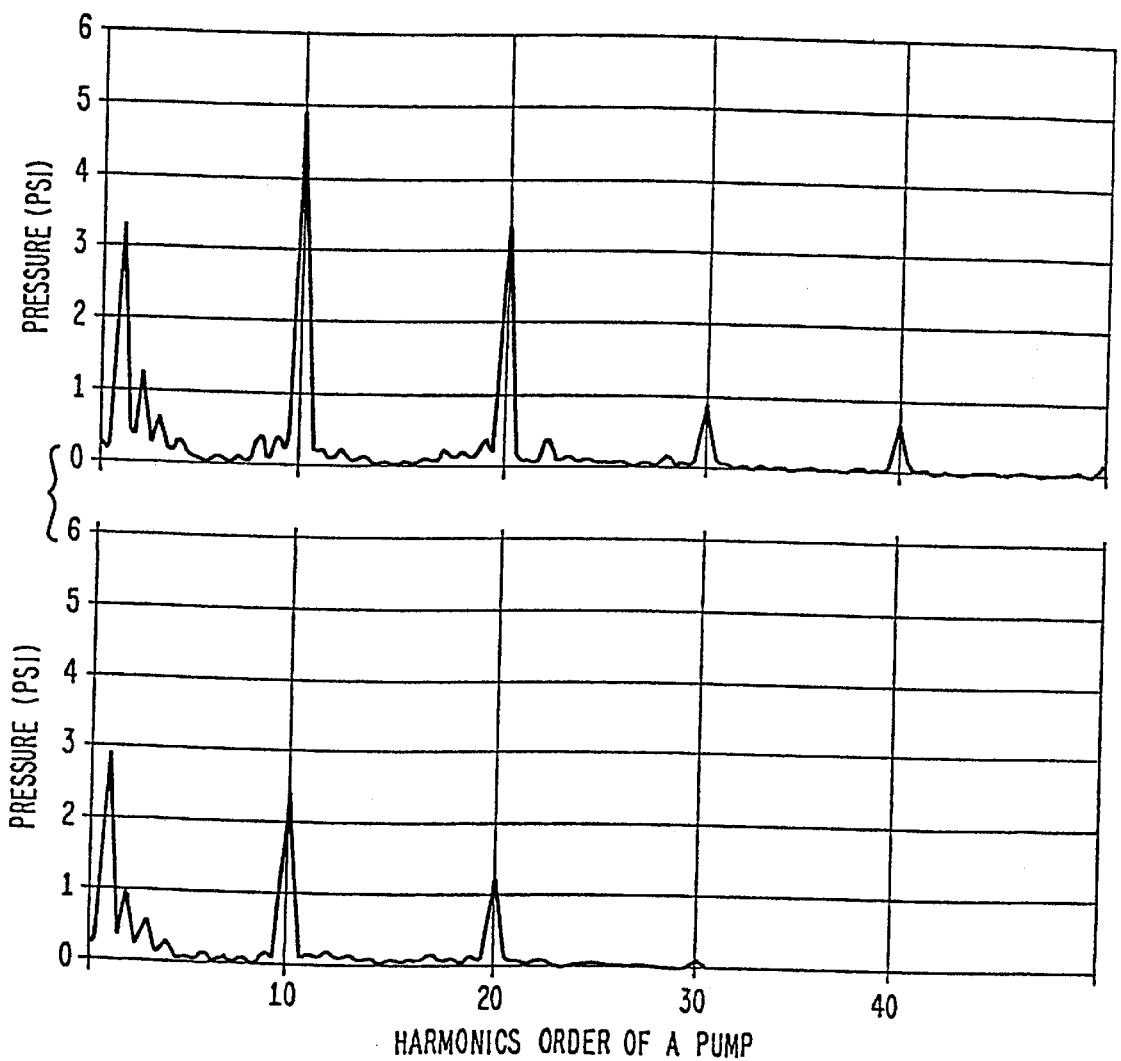
FIG. 29 is a graph showing the improvement in pressure attenuation achieved with the energy attenuation apparatus of this invention.

As indicated previously, the pressure pulses resulting from the revolutions of the pump create harmonics and noise. This phenomenon, along with the significant improvement provided by the inventive energy attenuation apparatus, is shown in FIG. 29, wherein pressure is plotted against the harmonics order of a given pump, with this pump generating ten pulses per revolution thereof. These 10 pulses are considered as the 10th order with the following harmonics being 20th, 30th, etc. This graph, which was plotted for the system of FIG. 1, namely the embodiment of the energy attenuation apparatus 20 of FIG. 4, was effected at a system pressure of 900 psi and a pump speed of 1200 RPM. The pressure at the outlet end of the pump is shown in the upper portion of the graph, whereas the pressure in the pressure line downstream of the energy attenuation apparatus is shown in the lower portion of the graph. The significant improvement accomplished with the inventive energy attenuation apparatus can be clearly seen from this graph. For example, for the tenth order of the pump, a reduction of about 56% is achieved, while for the 20th order, a reduction of about 62% is achieved. Subsequent to the 20th order, the pressure pulses are nearly entirely eliminated.

In view of the foregoing, it can be seen that this invention not only provides a new energy attenuation apparatus, but also this invention provides a new method for attenuating sound or energy in a liquid conveying system.

While the forms and methods of this invention now preferred have been illustrated and described as required by the Patent Statute, it is to be understood that other forms and method steps can be utilized and still fall within the scope of the appended claims, whereby it is believed that each claim sets forth a novel, useful and unobvious invention within the purview of the Patent Statute.

What is claimed is:

1. An energy attenuation apparatus for a system conveying liquid under pressure, wherein said apparatus is disposed in a liquid conveying means of said system, said apparatus comprising:

an outer hose means;

restrictor means disposed in said hose means and dividing the interior of said hose means into an inlet chamber and an outlet chamber that communicate with one another via said restrictor means, wherein each of said chambers has an inlet end and an outlet end;

a first tuning cable means of polymeric material disposed in said inlet chamber, wherein said first tuning cable means has a first end connected to said inlet end of said inlet chamber for receiving said liquid from said system, and a second open end that is spaced from said outlet end of said inlet chamber for conveying said liquid thereto; and a second tuning cable means of polymeric material disposed in said outlet chamber, wherein said second tuning cable means has a first end connected to said restrictor means for receiving said liquid, and a second open end that is spaced from said outlet end of said outlet chamber for conveying said liquid thereto.

2. An energy attenuation apparatus according to claim 1, wherein a further restrictor means is disposed in said hose means to form a further chamber that communicates with said outlet chamber via said further restrictor means, and wherein a third tuning cable means of polymeric material is disposed in said further chamber, wherein said third tuning cable means has a first end connected to said further restrictor means for receiving said liquid, and a second open end that is spaced from an outlet end of said further chamber for conveying said liquid thereto.

3. An energy attenuation apparatus according to claim 1, wherein a further hose means having a further chamber is provided, wherein a tubing means is provided to provide communication between said further chamber and one of said other chambers, and wherein a third tuning cable means of polymeric material is disposed in said further chamber, wherein one end of said third tuning cable means is connected to an inlet end of said further chamber or to said tubing means for receiving said liquid, and a second open end of said third tuning cable is spaced from an outlet end of said further chamber for conveying said liquid thereto.

4. An energy attenuation apparatus according to claim 1, wherein a peripheral surface of at least one of said tuning cable means is provided with at least one aperture.

5. An energy attenuation apparatus according to claim 1, wherein the ratio of the effective length of said first tuning cable means to the effective length of said second tuning cable means ranges from 5:1 to 1:5.

6. An energy attenuation apparatus according to claim 1, wherein said open ends of said tuning cable means are spaced from said outlet ends of their respective chambers by an amount ranging from 10 to 254 mm.

7. An energy attenuation apparatus according to claim 1, wherein said tuning cable means have a length of from 60–500 mm.

8. An energy attenuation apparatus according to claim 7, wherein the ratio of the effective length of said first tuning cable means to the effective length of said second tuning cable means ranges from 5:1 to 1:5.

9. An energy attenuation apparatus according to claim 7, wherein said open ends of said tuning cable means are spaced from said outlet ends of their respective chambers by an amount ranging from 10 to 254 mm.

10. An energy attenuation apparatus for a system conveying liquid under pressure, wherein said apparatus is disposed in a liquid conveying means of said system, said apparatus comprising:

two outer hose means, each of which defines a chamber having an inlet end and an outlet end;

tubing means interconnecting said two hose means, wherein said chambers communicate with one another via said tubing means;

a first tuning cable means of polymeric material disposed in one of said chambers, wherein said first tuning cable means has a first end connected to said inlet end of said one chamber for receiving said liquid from said system, and a second open end that is spaced from said outlet end of said one chamber for conveying said liquid thereto; and a second tuning cable means of polymeric material disposed in the other of said chambers, wherein said second tuning cable means has a first end connected to said tubing means for receiving said liquid, and a second open end that is spaced from said outlet end of said other chamber for conveying said liquid thereto.

11. An energy attenuation apparatus according to claim 10, wherein a further hose means is provided, wherein a further tubing means is provided to provide communication between a chamber of said further hose means and one of said other chambers, and wherein a third tuning cable means of polymeric material is disposed in said chamber of said further hose means, wherein said third tuning cable means has a first end connected to said further tubing means for receiving said liquid, and a second open end that is spaced from an outlet end of said chamber of said further hose means for conveying said liquid thereto.

12. An energy attenuation apparatus according to claim 10, wherein a restrictor means is disposed in one of said hose means to provide a further chamber therein that communicates with the other chamber via said restrictor means, and wherein a third tuning cable means of polymeric material is disposed in said further chamber, wherein said third tuning cable has a first end connected to said restrictor means for receiving said liquid, and a second open end that is spaced from an outlet end of said further chamber for conveying said liquid thereto.

13. An energy attenuation apparatus according to claim 10, wherein a peripheral surface of at least one of said tuning cable means is provided with at least one aperture.

14. An energy attenuation apparatus according to claim 10, wherein said tuning cable means have a length of from 60–500 mm.

15. An energy attenuation apparatus for a system conveying liquid under pressure, wherein said apparatus is disposed in a liquid conveying means of said system, said apparatus comprising:

an outer hose means;

restrictor means disposed in said hose means and dividing the interior of said hose means into an inlet chamber and an outlet chamber that communicate with one another via said restrictor means, wherein each of said chambers has an inlet end and an outlet end;

a first tuning cable means of polymeric material disposed in said inlet chamber, wherein said first tuning cable means has a first end connected to said restrictor means for conveying said liquid thereto, and a second open end that is spaced from said inlet end of said inlet chamber for receiving said liquid from said system; and a second tuning cable means of polymeric material disposed in said outlet chamber, wherein said second tuning cable means has a first end connected to said outlet end of said outlet chamber for conveying said liquid thereto, and a second open end that is spaced from said restrictor means.

16. An energy attenuation apparatus for a system conveying liquid under pressure, wherein said apparatus is disposed in a liquid conveying means of said system, said apparatus comprising:

two outer hose means, each of which defines a chamber having an inlet end and an outlet end;

tubing means interconnecting said two hose means, wherein said chambers communicate with one another via said tubing means;

a first tuning cable means of polymeric material disposed in one of said chambers, wherein said first tuning cable means has a first end connected to said tubing means for conveying said liquid thereto, and a second open end that is spaced from said inlet end of said one chamber for receiving said liquid from said system; and a second tuning cable means of polymeric material disposed in the other of said chambers, wherein said second tuning cable means has a first end connected to said outlet end of said other chamber for conveying said liquid thereto, and a second open end that is spaced from said tubing means.

\* \* \* \* \*